United States Patent [19]
Kaiser et al.

[11] 4,164,144
[45] Aug. 14, 1979

[54] FLUID FLOWMETER

[75] Inventors: Hermann Kaiser, Utica, Mich.; Richard A. Nellums, Kirkwood, Mo.; Jerry A. Olson, Dearborn, Mich.

[73] Assignee: Eaton Corporation, Cleveland, Ohio

[21] Appl. No.: 845,751

[22] Filed: Oct. 26, 1977

[51] Int. Cl.² .............................................. G01F 1/44
[52] U.S. Cl. ........................................ 73/213; 73/214
[58] Field of Search ..................... 73/205 R, 212, 213, 73/214

[56] References Cited

U.S. PATENT DOCUMENTS

| | | | |
|---|---|---|---|
| 1,897,858 | 2/1933 | Peck | 73/205 |
| 3,086,395 | 4/1963 | York | 73/205 |
| 3,307,396 | 3/1967 | Griffo | 73/214 |
| 3,889,536 | 6/1975 | Sylvester | 73/212 |

FOREIGN PATENT DOCUMENTS 171129  6/1965  U.S.S.R. ................................... 73/214

*Primary Examiner*—Herbert Goldstein
*Attorney, Agent, or Firm*—R. J. McCloskey; D. Wood; G. Lewis

[57] ABSTRACT

A low pressure drop air flowmeter for an automotive engine is disclosed. The meter includes a main air flow passage, a relatively small venturi tube receiving a portion of the air flow, a pressure port for sensing stagnation pressure in the main passage, a pressure port for sensing static pressure in the throat of the venturi, and a set of stationary swirl vanes disposed adjacent the outlet of the venturi and operative to impart a swirl to the remainder of the air in the main passage, thereby creating a reduced pressure at the venturi outlet for amplifying the pressure difference between the stagnation and static pressures without appreciably increasing the pressure drop across the flowmeter. Also disclosed is a solenoid valve having a single valving member operative in one position to communicate the stagnation pressure to an absolute pressure transducer and operative in another position to communicate the static pressure to the transducer.

22 Claims, 4 Drawing Figures

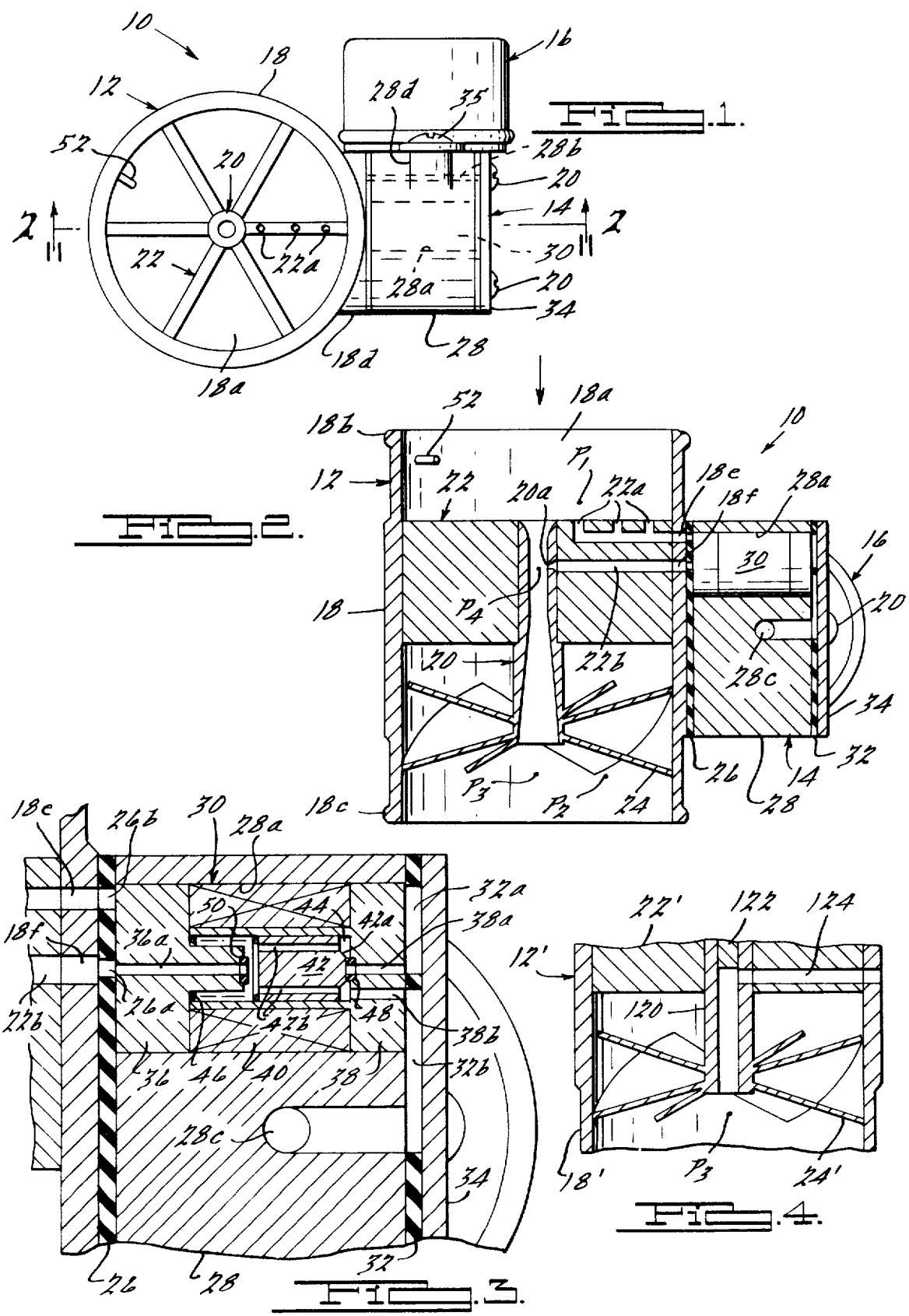

FLUID FLOWMETER

BACKGROUND OF THE INVENTION

1. Field of the Invention

This invention relates to a fluid flowmeter and, more specifically, to such a flowmeter including means for amplifying the static pressure signal in a tube or venturi.

2. Description of the Prior Art

Fluid flowmeters of the pressure drop or differential pressure type are well known. Orifice plate and venturi flowmeters are probably the most common of the pressure drop type. Orifice plate flowmeters are inexpensive, but they are inherently high energy loss devices since the measured pressure drop across the orifice is non-recoverable, i.e., the drop in pressure is a drop in total pressure. Venturi flowmeters are low energy loss devices relative to orifice plate flowmeters since most of the pressure drop in the venturi throat is recoverable at the venturi outlet, i.e., the drop in pressure in the throat is due to an increase in kinetic energy of the fluid. However, when either of these flowmeters are used to measure fluid flow which varies over a wide range, such as air flow to an automotive engine, they either overly restrict total air flow at high engine speeds and loads if they are sized small enough to provide an adequate differential pressure signal at low engine speeds and loads, or they provide an inadequate differential pressure signal at low engine speeds and loads if they are sized larger.

One prior art patent proposed a fluid flowmeter having a main air passage and a relatively small venturi tube in the main air passage receiving a portion of the total air flow and providing a static pressure signal for determining volumetric air flow in conjunction with a stagnation pressure signal in the main passage. This same patent also proposed placing a restriction in the main passage between the venturi inlet and outlet to increase the pressure difference across the venturi and thereby increase the pressure difference between the static and stagnation pressure. However, the restriction has the disadvantage of increasing the total pressure drop across the flowmeter, thereby increasing energy losses and decreasing the operating range of the flowmeter.

SUMMARY OF THE INVENTION

An object of this invention is to provide a fluid flowmeter which is low in cost, high in accuracy, and operable to provide an adequate pressure differential signal at low fluid flows and a low pressure drop at high fluid flows.

Another object of this invention is to provide a fluid flowmeter which has no moving parts in the flow area of the meter and is therefore durable and quick in response time.

Another object of this invention is to provide a fluid flowmeter having means to amplify a pressure differential signal without appreciably increasing the total pressure drop across the entire flowmeter.

According to a feature of the invention, the flowmeter includes a main passage having a fluid flow therein, swirl means operative to swirl the fluid flow about a central axis defined by the passage and thereby impart a high velocity to the fluid about the central axis for forming a low static pressure region about the central axis, means for sensing the low static pressure, and means for sensing the pressure of the fluid before the swirl means.

According to another feature of the invention, the flowmeter of the above feature includes a secondary passage disposed about the central axis for communicating a portion of the fluid in the main passage upstream of the swirl means with the low pressure region.

According to another feature of the invention, the secondary passage of the above feature is a venturi tube having a throat and means for sensing the low static pressure in the throat.

BRIEF DESCRIPTION OF THE DRAWING

The preferred embodiment of the invention is shown in the accompanying drawing in which:

FIG. 1 illustrates an end view of the subject fluid flowmeter;

FIG. 2 is a sectional view of the flowmeter taken along lines 2—2 of FIG. 1;

FIG. 3 is an enlarged sectional view of a valve in FIG. 2; and

FIG. 4 is a modified partial view of a portion of the invention wherein primed members designate parts which are substantially the same as like numbered parts in the other figures.

DETAILED DESCRIPTION OF THE DRAWING

Referring now to FIGS. 1 and 2, therein is shown a fluid flowmeter assembly 10 including a flowmeter section 12, a valve section 14, and a pressure transducer 16. The flowmeter assembly 10, as disclosed, is adapted for measuring the mass air flow to an internal combustion engine. However, the flowmeter section, with or without valve section 14 and/or transducer 16, may be used in other environments as a mass flowmeter or a volumetric flowmeter.

Flowmeter section 12 includes a round walled, tubular housing 18, a venturi tube 20 disposed along a central axis defined by the housing, a set of six radially disposed air straightening vanes 22 fixed at their radially inner and outer ends to the outer and inner walls of the venturi tube and housing, respectively, and a set of six radially disposed swirl vanes 24 fixed at their radially inner ends to the outer wall of the venturi at a 60 degree angle with respect to air flowing parallel to the central axis. Venturi tube 20 may be replaced by a straight walled tube or a substantially straight walled tube. However, the venturi tube has been found to provide a lower static pressure, particularly when the total air flow through the flowmeter is low, and therefore a greater differential pressure signal.

The housing 18 defines a main air flow passage 18a and includes beaded ends 18b and 18c at its inlet and outlet, respectively, for connecting the housing into a duct system, a boss 18d for mounting valve section 14 thereto by screws 20, a stagnation pressure passage 18e which communicates directly with three stagnation pressure ports 22a defined by one of the straightening vanes, and a static pressure passage 18f which communicates directly with a static pressure port 20a in the throat of venturi 20 via a static pressure passage 22b defined by one of the straightening vanes 22.

Operation of the flowmeter section 12 is as follows: Air enters the inlet of main passage 18a with a given axial or transport velocity. The stagnation pressure $P_1$ of the entering air is sensed by stagnation ports 22a; these ports or a single port may be disposed further upstream or external of the main passage. A portion of the air flows through the inlet of venturi 20 and the remainder of the air flows through straightening vanes 22 which remove substantially all pre-swirl in the air due to upstream conditions. When the air leaves the straightening vanes, it has a substantially uniform and homogenous axial flow pattern parallel to the central axis as it enters the swirl vanes. The swirl vanes impart a substantially 60° swirl velocity vector to the air. The axial and tangential velocity vector components of the swirl velocity form an air flow pattern (known as a forced-vortex flow) similar to a tornado which has a high velocity at the central axis and a diminishing velocity radially outward from the central axis. This resulting radial velocity gradient forms an associated radial pressure gradient having a static pressure $P_2$ at the radius of mean mass flow of air through the main passage, and a low static pressure region $P_3$ at the central axis. This low pressure accelerates the air leaving the outlet of the venturi and therefore amplifies the velocity of the air flowing through the venturi. As a result, the static pressure $P_4$ of the air in the venturi throat is proportionally decreased. The total volumetric or mass air flow through the flowmeter may then be calculated in a known manner by known fluid flow principles in conjunction with the expression $P_1 - P_4 = K(P_1 - P_2)$, wherein K is a proportionality constant. K may be empirically determined.

The static pressure $P_4$ in the venturi throat is directly related to the total air flow through the meter since the amount of air flowing through the venturi is directly related to the low static pressure $P_3$ produced by the swirl vanes. Hence, the disclosed flowmeter does not depend on or use localized air flow techniques to measure air flow, which localized air flow in some modes of operation may be far from representative of total air flow through a meter.

Valve section 14, which is shown in greater detail in FIG. 3, incldes a gasket 26, a puck-shaped housing 28, having a through bore 28a, a solenoid valve 30 disposed in the bore, a gasket 32, and a cover plate 34. Housing 28 further includes a boss 28d (see FIG. 1) for securing transducer 16 thereto via screws 35 and an outlet passage 28c for communicating the solenoid valve outlet with the transducer.

Solenoid 30 includes end members 36 and 38, a solenoid coil 40, a single valving member 42 slidably disposed in a chamber 44 defined by the end members and the coil, and a helical spring 46 for biasing the valving member rightward as seen in the drawing. End member 36 includes a passage 36a for communicating chamber 44 with static pressure port 20a via a hole 26a in gasket 26. End member 38 includes a passage 38a for communicating chamber 44 with stagnation ports 22a via a substantially L-shaped slot having an unshown arcuate leg and a radially extending leg 32a in gasket 32, a through passage 28b in housing 28 (see FIG. 1), and a slot 26b in gasket 26. Slot 26b has an arcuate shape that matches the arcuate shape of the arcuate leg in the L-shaped slot of gasket 32. End member 38 also includes an outlet passage 38b for directly communicating chamber 44 with outlet passage 28c via a radially extending slot 32b in gasket 32. Valving member 42 includes a raised center portion 42a at one end and a pair of through passages 42b. When valving member 42 is biased to the right, as shown, static port pressure 20a is communicated to outlet passage 38b via passages 42b and raised portion 42a seats against an o-ring seal 48 for blocking off stagnation port pressure to chamber 44.

When coil 40 is energized, valving member 42 moves leftward and seats against an o-ring seal 50 for blocking off static port pressure to chamber 44 and for communicating stagnation port pressure to outlet passage 38b via chamber 44.

Pressure transducer 16 may be any of several well known types. Herein, transducer 16 is an absolute pressure transducer of the type described in S.A.E. Paper 770397 and made by the Instruments Division of Bunker Ramo Corporation. The transducer measures the absolute stagnation and static pressures from the flowmeter and produces electrical output signals representative of each pressure. These signals may be processed by an electronic logic system to produce a signal representative of the volumetric air flow through the flowmeter or, since the stagnation pressure is compared with absolute pressure, the signals may be processed with an absolute air temperature signal provided by a temperature sensor 52 in the inlet of the main air passage 18a to produce a signal representative of mass air flow through the flowmeter.

The modified partial view of flowmeter section 12' in FIG. 4 discloses a somewhat broadened form of the invention. In FIG. 4, the venturi is replaced by a straight tube 120 which is blocked at its upper end by a plug 122, but tubular housing 18', straightening vanes 22', and swirl vanes 24' are substantially the same as in FIGS. 1 and 2. A static pressure port 124 extends through straightening vanes in a manner as described in FIGS. 1 and 2. When straight tube 120 is blocked, port 124 directly senses the low static $P_3$ without amplification of the static pressure signal. Straight tube 120 may be open at both ends so as to allow air flow therethrough for aspirating the static port 124 and amplifying the low static pressure $P_3$.

The preferred embodiments of the invention have been disclosed for illustration purposes. Many variations and modifications of the preferred embodiments are believed to be within the spirit of the invention. For example, swirl vanes 24 may be disposed at angles other than 60 degrees, the straightening vanes could be omitted, the straightening and swirl vanes could be combined, the number of these vanes could be varied, or other devices could be used to impart swirl to the air without causing an appreciable total pressure drop across the meter. Further, valve section 14 and transducer 16 could be dispensed with or a different type of valve and/or transducer could be used. The following claims are intended to cover the inventive portions of the preferred embodiments and variations and modifications believed to be within the spirit of the invention.

What is claimed is:

1. In a device including a main passage for the flow of a fluid therethrough; a secondary passage disposed within and extending substantially parallel to an axis defined by said main passage, the secondary passage including a converging inlet for receiving a portion of the fluid flowing in said main passage and an outlet for discharging the portion back into the main passage; means for sensing the stagnation pressure of the fluid; and means for sensing the static pressure of the fluid in the secondary passage; wherein the improvement comprises:

means operative to receive at least a portion of the remaining fluid in said main passage and impart a velocity vector thereto tangential to said axis for creating a reduced pressure area at the outlet of said secondary passage, thereby reducing the static pressure of the fluid in the secondary passage.

2. The device of claim 1, wherein said operative means comprises:
a set of swirl vanes radially disposed between said secondary and main passage at an angle oblique to the flow direction of said remaining fluid.

3. The device of claim 1, wherein said secondary passage comprises:
a venturi tube.

4. The device of claim 1, further comprising:
pressure transducer means communicable with said stagnation and static pressure means and operative to produce electrical signals representative of said stagnation and static pressures.

5. The device of claim 1, further comprising:
absolute pressure transducer means communicable with said stagnation and static pressure means and operative to produce electrical signals representative of the absolute pressure of said stagnation and static pressures.

6. The device of claim 1, further including:
straightening vanes disposed in said main passage upstream of said operative means.

7. In a device including a main passage for the flow of a fluid therethrough; a venturi tube disposed within and extending substantially parallel to said central axis, said venturi tube including an inlet for receiving a portion of the fluid flowing in said main passage, a throat, and an outlet for discharging the portion back into the main passage; stagnation pressure sensing means disposed in said main passage; and static pressure sensing means disposed in said throat; wherein the improvement comprises:
a set of swirl vanes disposed radially adjacent the outlet of said venturi tube and at an angle oblique to the remaining fluid flowing in said main passage for creating a reduced pressure area at the outlet of said venturi tube, thereby reducing the static pressure of the fluid in the throat of said venturi.

8. The device of claim 7, further comprising:
a set of straightening vanes for supporting said venturi tube in said main passage and for removing pre-swirl from the fluid in said main passage prior to the fluid flowing through said swirl vanes.

9. The device of claim 7, further comprising:
a pressure transducer communicable with said stagnation and static pressure sensing means; and
valve means operative to alternately communicate said stagnation and static pressure sensing means with said transducer.

10. The device of claim 7, further comprising:
a set of radially extending straightening vanes disposed between and outer and inner walls of said venturi tube and said main passage, respectively, for supporting said venturi tube in said main passage and for removing pre-swirl from the fluid in said main passage prior to the fluid flowing through said swirl vanes;
an absolute pressure transducer communicable with said stagnation and static pressure sensing means; and
valve means operative to alternately communicate said stagnation and static pressure sensing means with said transducer.

11. A device for measuring the flow of a fluid therethrough comprising:
means defining a main passage;
means defining a secondary passage disposed within and extending substantially parallel to the direction of flow in said main passage, said secondary passage including a converging inlet for receiving a portion of the fluid flowing in said main passage and an outlet for discharging said portion into the main passage downstream of said inlet;
means for sensing the stagnation pressure of the fluid in a portion of the main passage upstream of said main passage outlet;
means for sensing the static pressure of the fluid in the secondary passage;
means receiving at least a portion of the remaining fluid in said main passage and operative to impart a velocity thereto at an angle to said main passage flow for creating a reduced pressure region at the outlet of said secondary passage, thereby reducing the static pressure of the fluid in the secondary passage; and
means operative to sense the difference between said stagnation pressure and said reduced static pressure in said secondary passage.

12. In a device including a main passage for the flow of a fluid therethrough; a venturi tube disposed within and extending substantially parallel to an axis defined by said main passage, the venturi tube including an inlet for receiving a portion of the fluid flowing in said main passage and an outlet for discharging the portion back into the main passage; means for sensing the stagnation pressure of the fluid; and means for sensing the static pressure of the fluid in the venturi tube; wherein the improvement comprises:
a set of swirl vanes disposed adjacent the outlet of said venturi tube at an angle oblique to the flow direction of the remaining fluid in said main passage and operative to impart a velocity vector thereto tangential to said axis for creating a reduced pressure area at the outlet of said venturi tube, thereby reducing the static pressure of the fluid in the venturi tube.

13. In a device including a main passage for the flow of a fluid therethrough; a secondary passage disposed within and extending substantially parallel to an axis defined by said main passage, the secondary passage including an inlet for receiving a portion of the fluid flowing in said main passage and an outlet for discharging the portion back into the main passage; means for sensing the stagnation pressure of the fluid; and means for sensing the static pressure of the fluid in the secondary passage; wherein the improvement comprises:
means operative to receive at least a portion of the remaining fluid in said main passage and impart a velocity vector thereto tangential to said axis for creating a reduced pressure area at the outlet of said secondary passage, thereby reducing the static pressure of the fluid in the secondary passage; and
straightening vanes disposed in said main passage upstream of said operative means and extending between the outer walls of said secondary passage and the inner walls of said main passage for supporting said secondary passage within said main passage.

14. The device of claim 13, wherein said stagnation pressure sensing means includes a stagnation pressure port and a first stagnation pressure passage defined by one of said straightening vanes for communicating said stagnation pressure to a second stagnation pressure passage extending through the wall of said main passage; and wherein said static pressure sensing means includes a static pressure port in said secondary passage and a first static pressure passage defined by one of said straightening vanes for communicating said static pressure to a second static pressure passage through the wall of said main passage.

15. In a device including a main passage for the flow of a fluid therethrough; a secondary passage disposed within and extending substantially parallel to an axis defined by said main passage, the secondary passage including an inlet for receiving a portion of the fluid flowing in said main passage and an outlet for discharging the portion back into the main passage; means for sensing the stagnation pressure of the fluid; and means for sensing the static pressure of the fluid in the secondary passage; wherein the improvement comprises:

means operative to receive at least a portion of the remaining fluid in said main passage and impart a velocity vector thereto tangential to said axis for creating a reduced pressure area at the outlet of said secondary passage, thereby reducing the static pressure of the fluid in the secondary passage; and a valve having a stagnation pressure passage in direct communication with said stagnation pressure sensing means, a static pressure passage in direct communication with said static pressure sensing means, an outlet passage, and a single valving member operative in a first position to communicate said stagnation pressure passage with said outlet passage and block communication between said static pressure passage and said outlet passage and operative in a second position to communicate said static pressure passage with said outlet passage and block communication between said stagnation pressure passage and said outlet passage.

16. The device of claim 15, wherein said operative means comprises:

a set of swirl vanes radially disposed between said secondary and main passage at an angle oblique to the flow direction of said remaining fluid.

17. The device of claim 15, wherein said secondary passage comprises:

a venturi tube.

18. The device of claim 15, further comprising:

pressure transducer means communicable with said stagnation and static pressure means and operative to produce electrical signals representative of said stagnation and static pressures.

19. The device of claim 15, further comprising:

absolute pressure transducer means communicable with said stagnation and static pressure means and operative to produce electrical signals representative of the absolute pressure of said stagnation and static pressures.

20. The device of claim 15, further including:

straightening vanes disposed in said main passage upstream of said operative means.

21. A fluid flowmeter comprising:

a main passage for the flow of fluid therethrough and defining a central axis;

a secondary passage disposed within and extending substantially parallel to the central axis, said secondary passage including a conically converging inlet for receiving a portion of the fluid flowing in said main passage, and an outlet for discharging the portion back into the main passage;

swirl means disposed radially adjacent the outlet of said secondary passage and operative to receive at least a portion of the remaining fluid in said main passage and impart a velocity vector thereto tangential to said axis for creating a reduced pressure area at the outlet of said secondary passage, thereby reducing the static pressure of the fluid in the secondary passage;

static pressure sensing means disposed in said secondary passage; and means for sensing the stagnation pressure of the fluid before the swirl means.

22. The flowmeter of claim 21, wherein said means for sensing said low static pressure is disposed in said secondary passage.